United States Patent
McCown et al.

(10) Patent No.: US 11,177,937 B1
(45) Date of Patent: Nov. 16, 2021

(54) APPARATUS AND METHOD FOR ESTABLISHING TRUST OF ANONYMOUS IDENTITIES

(71) Applicant: Anonyome Labs, Inc., Draper, UT (US)

(72) Inventors: Steven Harvey McCown, Mapleton, UT (US); Paul Ashley, Toowong (AU); Matthew Poulton, Saint George, UT (US); John D. Mumford, Portola Valley, CA (US); Steve Shillingford, Draper, UT (US); Greg Clark, San Francisco, CA (US)

(73) Assignee: ANONYOME LABS, INC., Salt Lake City, UT (US)

(*) Notice: Subject to any disclaimer, the term of this patent is extended or adjusted under 35 U.S.C. 154(b) by 120 days.

(21) Appl. No.: 16/049,606

(22) Filed: Jul. 30, 2018

Related U.S. Application Data

(60) Provisional application No. 62/640,466, filed on Mar. 8, 2018.

(51) Int. Cl.
   *H04L 29/06* (2006.01)
   *H04L 9/06* (2006.01)
   *H04L 9/32* (2006.01)
   *G06F 16/901* (2019.01)

(52) U.S. Cl.
   CPC ........ *H04L 9/0637* (2013.01); *G06F 16/9024* (2019.01); *H04L 9/32* (2013.01)

(58) Field of Classification Search
   USPC ....................................... 713/155
   See application file for complete search history.

(56) References Cited

U.S. PATENT DOCUMENTS

| | | | |
|---|---|---|---|
| 9,363,283 B1* | 6/2016 | Herrera-Yague | G06F 21/50 |
| 9,372,987 B1 | 6/2016 | Ashley et al. | |
| 9,374,689 B1 | 6/2016 | Ashley et al. | |
| 9,703,986 B1* | 7/2017 | Ashley | G06F 21/6263 |
| 9,729,519 B1 | 8/2017 | Ashley et al. | |
| 10,178,106 B1 | 1/2019 | Ashley et al. | |
| 10,320,753 B1 | 6/2019 | Ashley et al. | |
| 10,931,650 B1 | 2/2021 | McCown et al. | |
| 2002/0103801 A1* | 8/2002 | Lyons | G06Q 30/02 |

(Continued)

FOREIGN PATENT DOCUMENTS

CA 2697964 A1 * 9/2010 ........... G06Q 10/107

*Primary Examiner* — Sakinah White Taylor
(74) *Attorney, Agent, or Firm* — Cooley LLP

(57) ABSTRACT

An apparatus has a processor and a memory connected to the processor. The memory stores instructions executed by the processor to compute computer network activity reputation attributes for a digital identity. The digital identity has identity attributes different than identity attributes associated with a real individual utilizing the digital identity for computer network activity. The storage of the computer network activity reputation attributes for the digital identity is coordinated within a block chain system distributed across a block chain network of computers. Computer network activity reputation attributes for the digital identity are supplied in response to a request from a machine. The computer network activity reputation attributes are communicated over a network of computers to the machine.

8 Claims, 10 Drawing Sheets

(56) References Cited

U.S. PATENT DOCUMENTS

| | | | | |
|---|---|---|---|---|
| 2006/0031359 | A1* | 2/2006 | Clegg | H04L 51/12 709/206 |
| 2008/0178271 | A1* | 7/2008 | Gajjala | H04L 63/08 726/6 |
| 2011/0066605 | A1* | 3/2011 | Elbaz | G06F 16/345 707/705 |
| 2012/0310831 | A1* | 12/2012 | Harris | G06Q 30/02 705/44 |
| 2014/0047518 | A1* | 2/2014 | Pravetz | H04L 63/08 726/5 |
| 2014/0074547 | A1* | 3/2014 | B'Far | G06Q 10/105 705/7.28 |
| 2015/0332361 | A1* | 11/2015 | Meister | G06Q 30/0609 705/26.35 |
| 2017/0118240 | A1* | 4/2017 | Devi Reddy | H04L 63/1433 |
| 2017/0192994 | A1* | 7/2017 | Hong | G06F 16/164 |
| 2018/0025140 | A1* | 1/2018 | Edelman | G06F 21/33 726/7 |
| 2018/0089419 | A1* | 3/2018 | Loughlin-McHugh | G06F 21/45 |
| 2018/0374151 | A1* | 12/2018 | Joshi | G06Q 40/00 |

* cited by examiner

| Digital Identity ID | Reputation Algorithm | Reputation Score | Reputation Data |
|---|---|---|---|
| ID1 | A1 | 68 | D1, D2, D3, D4, D5 |
| ID2 | A2 | 99 | D6, D7, D8, D9, D10 |
| ID3 | A3 | 30 | D11, D12, D13, D14, D15 |
| ID4 | A4 | 55 | D15, D16, D17, D18, D19 |
| ID5 | A5 | 84 | D20, D21, D22, D23, D24 |

APPARATUS AND METHOD FOR ESTABLISHING TRUST OF ANONYMOUS IDENTITIES

CROSS-REFERENCE TO RELATED APPLICATION

This application claims priority to U.S. Provisional Patent Application Ser. No. 62/640,466, filed Mar. 8, 2018, the contents of which are incorporated herein by reference.

FIELD OF THE INVENTION

This invention relates generally to communications in computer networks. More particularly, this invention is directed toward techniques for establishing trust of anonymous identities operating in computer networks.

BACKGROUND OF THE INVENTION

The invention is disclosed in the context of the following definitions:

Blockchain: is a continuously growing list of records, called blocks, which are linked and secured using cryptography. Each block typically contains a cryptographic hash of the previous block, a timestamp and transaction data. By design, a blockchain is inherently resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority.

Cryptocurrency: "A digital currency in which encryption techniques are used to regulate the generation of units of currency and verify the transfer of funds, operating independently of a central bank." (Source: dictionary.com)

Digital Personal Identity: "A role-based Digital Personal Identity that is created, controlled, and managed by an individual and is used for verification, validation, and authentication."

Digital Legal Identity: "A digital equivalent of a Legal Identity, where personally identifiable information is generally assigned by a central authority."

Identity: "The characteristics determining who or what a person or thing is." (Source: Oxford Dictionary)

Legal Identity: "A set of identifying attributes, as designated by a Third Party (usually a government entity), that are used for verification, validation, and authentication."

Reputation: "The beliefs or opinions that are generally held about someone or something." (Source: Oxford Dictionary)

Reputation Ledger: "A set of immutable Reputation entries. While each Reputation entry is immutable, and the Reputation Ledger contains a series of immutable entries, the combined Reputation Score, which summarizes the Reputation entries for a given digital identity, may change over time as new entries are added."

Reputation Score: "The result of a reputation calculation algorithm applied to the past behaviors of a Digital Personal Identity."

Sudo Identity: "A role-based digital identity that is created, controlled and managed by an individual and is used for verification, validation and authentication. Also referred to as a Sudo."

SUDO®: "A registered trademark of Sudo, Inc., Salt Lake City, Utah, used in commerce activities related to Sudo Identities."

In the offline world, humans can be known by their reputations, which are essentially a set of beliefs or opinions that others (e.g., friends, associates, peer group, society) hold about someone (e.g., an individual, group, organization). Reputations are built over time by a wide range of activities that can include: accomplishments, actions, how one treats others, speech, writings, manners, honesty, honor, etc. One's reputation can also be influenced by the company that one keeps, which may be partially calculated by the reputations of one's friends, associations (e.g., educational degrees, memberships, certifications), etc. Reputation is also very contextual with individuals having reputations for their many different activities, such as: work, home, social club, hobbies, etc.

In the online world, a digital reputation is very analogous to a societal reputation in that it is established by actions an online user performs in the online world. Such actions may include: memberships, associations, accomplishments, manners (e.g., 'netiquette'), their speech/writings, whether they are honest and trustworthy, or even whether they are dependable. Digital reputations may also be influenced by tangential associations, such as: an email provider (e.g., free provider vs. company-hosted domain), a user's operating system (e.g., MacOS vs. Windows vs. Linux, current vs. old version, etc.), digital tools used (e.g., web browser type, virtual private network), etc. In the preceding examples, digital items or services that cost more (e.g., company-owned domain, more expensive computers) may suggest the successfulness of the owner, which may in-turn contribute to reputation. Additionally, users may also make a direct correlation with their Legal Identity, which could optionally allow Legal Identity reputations to influence digital world reputations or vice versa.

In digital environments, users often operate anonymously or pseudonymously. This may be due to privacy concerns or it may be due to their choosing a friendly email address or user login name (e.g., a handle) that is playful and not representative of their actual name or Legal Identity. Online anonymity can provide online users with the same type of anonymity that they have in the physical world. For example, shopping mall patrons don't wear name badges, public transportation riders aren't required to give a phone number, and introductions at a cocktail party don't require a credit check. Moving throughout society without having to continuously identify oneself is a natural human activity.

Despite a large segment of society enjoying a personalized pseudonymous online identifier, there are also many who are concerned about anonymity and often state their objection by asking, "If you don't know who an internet user is, then how do you know if they are trustworthy?"

Accurately ascertaining trust in online settings does not require a direct correlation with a person's Legal Identity nor should it require the interrogation, collection, or storage of an individual's personally identifiable information (PII). Rather, it is contended here that determining whether another user is trustworthy (and therefore reliable) can be deduced by analyzing their online activities, associations, and interactions in ways that correspond to how this is done in the offline world.

This disclosure is an extension to the work outlined in U.S. Pat. No. 9,703,986, entitled Decentralized Reputation Service For Synthetic Identities, which is owned by the assignee of the current patent application. This disclosure presents a method whereby a Reputation Score can be calculated for anonymous online users by analyzing their public activities performed in online settings, analytics gathering, and/or other disclosed or discoverable data points. Inputs to the Reputation Score may come from the ratings or reviews submitted by other parties of verified transactions where an online user has participated, such as purchases, rentals, enrollments, etc. Among other things, this Reputation Score can help show whether an online user provides trustworthy, consistent, or predictable interactions with fellow online users. This can help others know, in advance of any interactions, whether a given user is likely to provide positive interactions in future situations.

Using a calculated Reputation Score provides other internet users with a common framework by which they can determine whether they want to trust and interact with another anonymous internet user-upon the very first contact. This new method of anonymous trust is achieved by calculating an online user's Reputation Score based on what they do and not based on who they are (e.g., Legal Identity). Reputations also provide an incentive model that encourages trust by creating a consequence framework for user behavior. As long as anonymous users behave in a trustworthy manner, their reputations should persist or increase, and third parties can be assured of expected outcomes (e.g., transaction completion, accurate information, high-quality/responsive user, etc.).

To avoid actions without consequence, this disclosure integrates and builds upon the concepts of online reputations and Strong Anonymity means that one can be very sure that:
  The anonymous person they interacted with last week is the same anonymous person they are interacting with, today.
  Any transaction cannot be disputed. If an anonymous person makes a deal today, then they cannot say it never happened, because the proof is available to everyone.
  Their pattern of transactions will not reveal their Legal Identity.

While the concept of anonymity comes with negative associations (What are people hiding? Shouldn't honest people be proud to stand tall?), today's technology presents an opportunity for anonymous users to develop and nurture a reputation score that other users can reference when deciding whether to trust an unknown online identity. Reputation helps other uses have confidence and trust in anonymous users without feeling the need to know their Legal Identity.

While reputation helps a new acquaintance ascertain the trustability of an anonymous user, it is also very context-sensitive in that a reputation score is very dependent upon the scenario in which it was created. For example, an individual may have a high reputation for giving beneficial online product reviews, however, that same person may also have a low reputation for discussion forum participation. In that scenario, it would be easy to trust that anonymous user to give product reviews, but not necessarily to engage in productive forum discussions. Similarly, another user may have a high reputation for completing purchase transactions, but also a poor reputation for friendly associations on social media. Specifying and taking into account the context of a reputation score is vital when using that reputation score to determine (or predict) a user's likely activity in new situations.

The Law of Transitive Trust means that if A trusts B and B trusts C, then A should be comfortable in trusting C. This concept can also be described as, "if A trusts B and B vouches for C, then A should feel more comfortable trusting C than if they hadn't received B's personal assertion". This concept also applies to Sudo Identities where a Sudo user (individual) may have several Sudo Identities (Digital Identity). For example, if the owner of a Digital Identity uses that identity to develop a positive reputation score, then it is possible for that first Digital Identity to share their reputation with another Digital Identity of their own creation. This is possible, because these two Digital Identities would be owned and operated by the same person and if the first Digital Identity is trustworthy, then the second Digital Identity (operated by the same person) should be trustworthy, as well. In addition to positive correlations, negative correlations are also possible. For example, if the original Digital Identity has a low reputation, then it might be inferable that the other Digital Identity would inherit the negative reputation, as well.

A Digital Personal Identity may also impacted by its associates. In the same way that a person is often judged by their friends and associates, if a Digital Personal Identity is associating (e.g., communicating) regularly with other Digital Personal Identities that have a poor reputation, or even a reputation for criminal activities, it is again sensible to infer that the Digital Personal Identity may also be judged to have a poor reputation. And just like real life, in this case the owner of the Digital Personal Identity may want to conceal those associations.

There are a wide range of reputation systems that are in use today. Such reputation systems include online reviewing systems (e.g., seller rating on an eCommerce site), financial credit rating services (e.g., credit bureau), or even a friendly 'word-of-mouth'. These reputation systems likely share some similar characteristics, but are often confined to a single domain representing a particular purpose. The reputation system described in this patent will address these types of limitations:
  Closed Environment—reputation systems that create reputation scores within their own application or environment without making those available to similar platforms.
  Single Scope—reputation systems that create reputation scores for one specific purpose (e.g., product sales) without calculating scores for additional activities of interest (e.g., customer support)
  Secret Processing—the algorithms in these reputation systems are hidden from public review. Such algorithms cannot be assessed for fairness or bias, which leaves them prone to suspected manipulation, results inflation, other unbiased processing, etc.

Thus, there is a need for improved online reputation systems.

SUMMARY OF THE INVENTION

An apparatus has a processor and a memory connected to the processor. The memory stores instructions executed by the processor to compute computer network activity reputation attributes for a digital identity. The digital identity has identity attributes different than identity attributes associated with a real individual utilizing the digital identity for computer network activity. The storage of the computer network activity reputation attributes for the digital identity is coordinated within a block chain system distributed across a block chain network of computers. Computer network activity reputation attributes for the digital identity are supplied in response to a request from a machine. The computer network activity reputation attributes are communicated over a network of computers to the machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
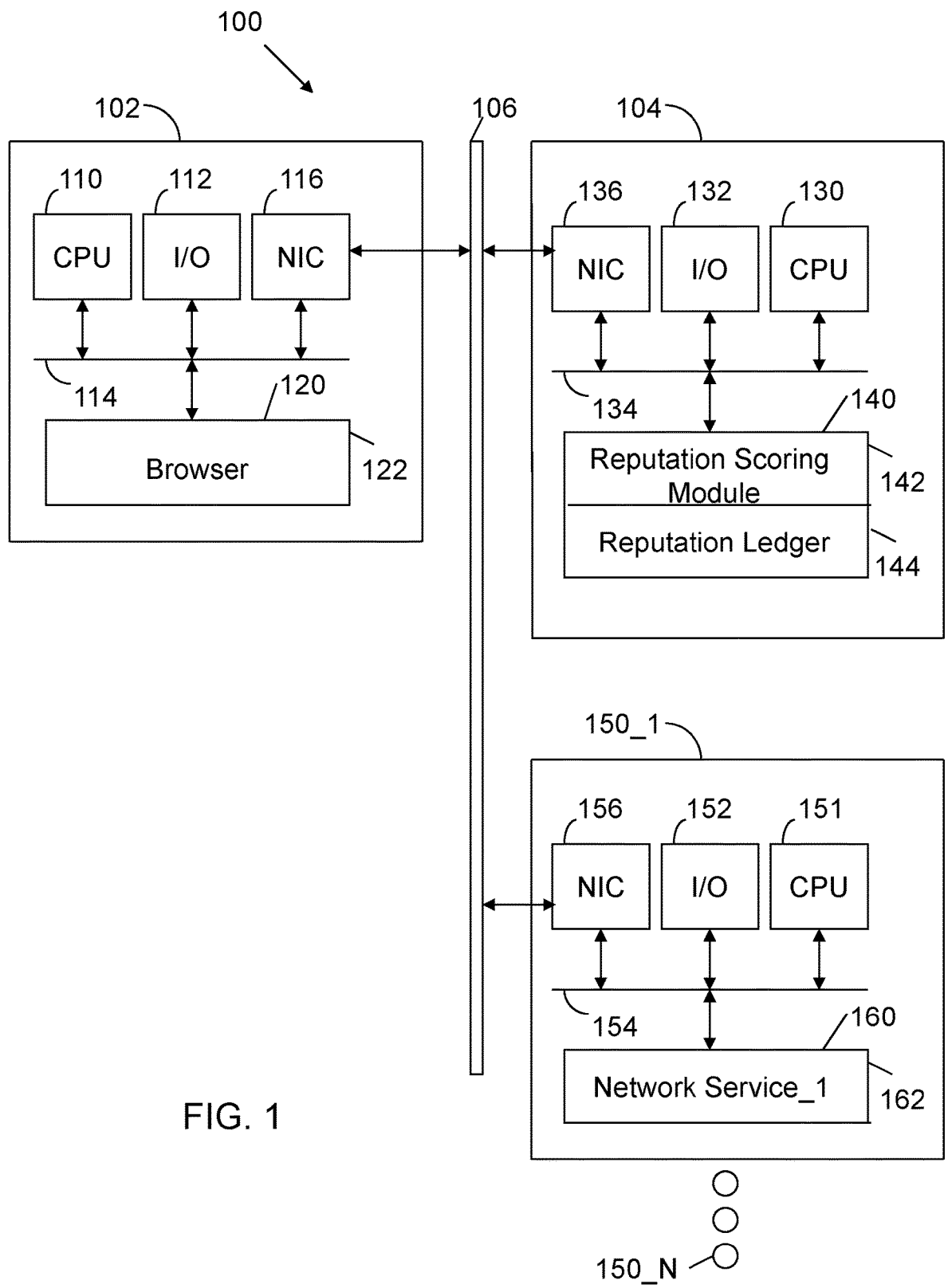
FIG. 1 illustrates a system configured in accordance with an embodiment of the invention.

FIG. 1 illustrates a system 100 configured in accordance with an embodiment of the invention. The system 100 includes a client machine 102 that communicates with a server 104 via a network 106, which may be any combination of wired and wireless networks. The client machine 102 includes a processor (e.g., a central processing unit) 110 that communicates with input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores a browser 122, which includes instructions executed by processor 110 that allows the client machine 102 to communicate with other machines connected to network 106. The client machine 102 may be operated by a user with a legal identity and one or more digital personal identities. The client machine 102 may be a computer, tablet, Smartphone and the like.

Server 104 includes a processor 130, input/output devices 132, a bus 134 and a network interface circuit 136. A memory 140 is connected to bus 140. The memory 140 stores a reputation scoring module 142, which includes instructions executed by processor 130 to implement operations disclosed herein. The memory 140 also stores a reputation ledger 144, with attributes discussed herein.

Additional servers 150_1 through 150_N are also connected to the network 106. Each additional server includes a processor 151, input/output devices 152, bus 154 and a network interface circuit 156. A memory 160 is connected to bus 154. The memory stores a network service module 162. The network service module 162 includes instructions executed by the processor 151 to implement a network service, such as a reputation lookup service, a reputation feedback service, public data on a digital personal identity, an internet service, public review data on a digital personal identity and social reviews on a digital personal identity. The memory 160 may also store a reputation scoring module 142 and/or parts of a distributed reputation ledger 144.

Reputations can be generated, stored, accessed, and augmented through a variety of methods, which will be described in the subsequent sections. Additionally, reputations may be computed dynamically for situational requests pertaining to particular scenarios. These situational scenarios enable the raw, immutable reputation data to be calculated in a variety of ways as defined below.

In one embodiment of this invention, when a new Digital Personal Identity is created by a user, that new Digital Personal Identity will start with a default Reputation Score. The assumption is that the Digital Personal Identity is as yet unknown, there is no evidential experience by which to judge the Digital Personal Identity's behavior, and therefore it should begin life with a low reputation default value. As the Digital Personal Identity participates in activities in online or offline settings, the reputation value will be augmented by tracking emerging positive or negative behavioral experiences.

In other embodiments, there are additional methods that allow the Digital Personal Identity to begin life with a different value than the default Reputation Score. In one embodiment, a user may optionally choose to link their newly created Digital Personal Identity with one or more of their other existing Digital Personal Identities and/or their Legal Identity. The presumption is that existing Digital Personal Identities have existing Reputation Scores that they have earned over time and that the owner of both Digital Personal Identities may want their new Digital Personal Identity to be reflective of their own previous activities. As an example, a first Digital Personal Identity may have operated as a productive member of one social network and, as a result, has earned a positive Reputation Score. In that scenario, linking an existing Digital Personal Identity with the new one enables the reputation system to determine a new starting reputation for the new Digital Personal Identity based on observable behavior of their other identity. The outcome is that the new Digital Personal Identity has a better starting Reputation Score than the default value.

Figure 2:
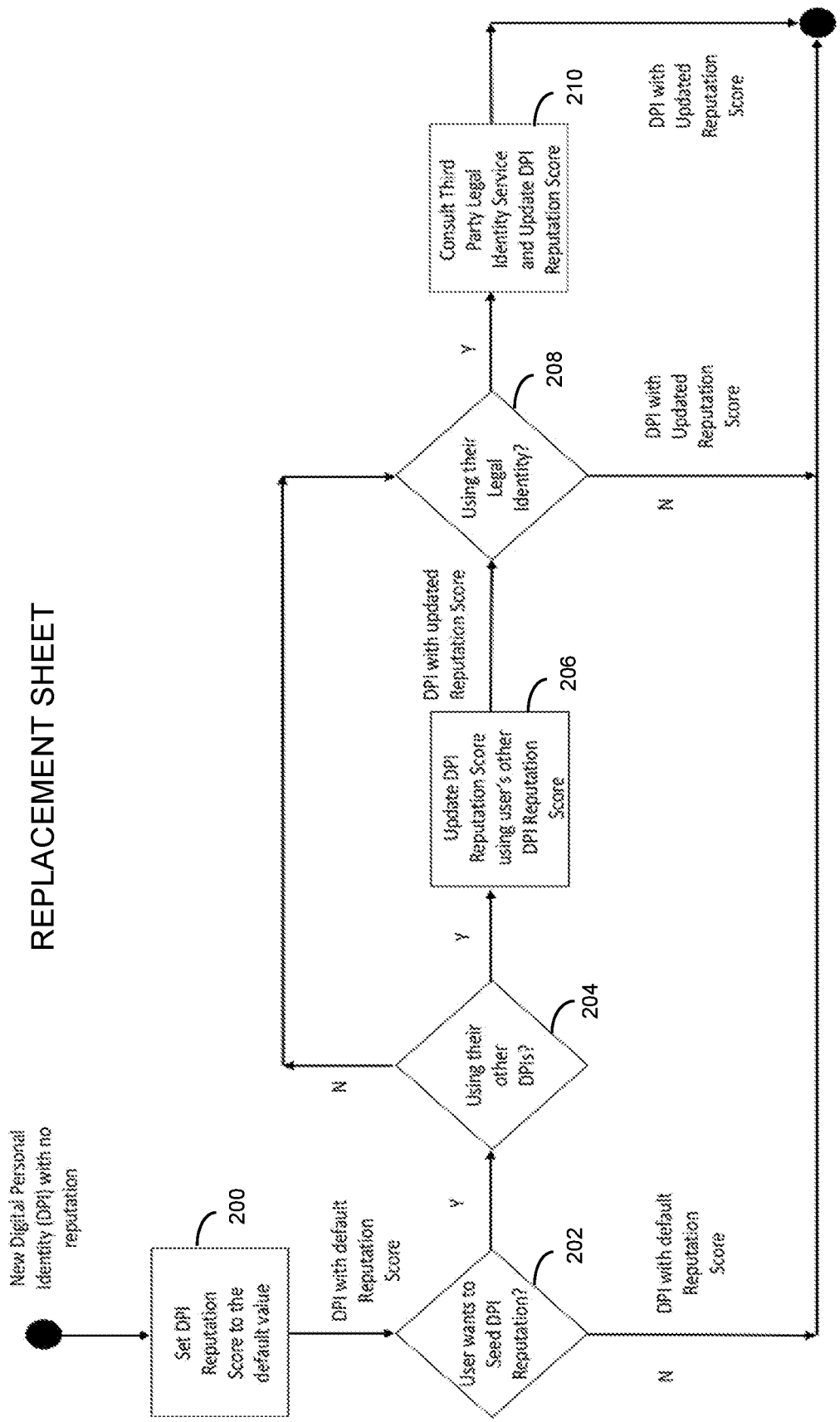
FIG. 2 illustrates operations of seeding a new digital personal identity reputation.

FIG. 2 shows the method whereby a user may seed the reputation of a new Digital Personal Identity with reputation values from one or more of their own existing digital identities and/or with their Legal Identity. For example, a user at client machine 102 accesses server 104 via network 106. The reputation scoring module 142 prompts the user for information about the new Digital Personal identity. The reputation scoring module 142 includes instructions executed by processor 130 to implement the operations shown in FIG. 2.

When a new Digital Personal Identity is created, it has the default Reputation Score set 200. If the user chooses to enhance the reputation of this new Digital Personal Identity (202—Yes), then the first method is to use the reputation of their other Digital Personal Identities (assuming they have them) (204—Yes) to boost the reputation of this new Digital Personal Identity. The user may choose to use the reputations of all or some of their Digital Personal Identities to enhance the reputation of their new Digital Personal Identity. This results in an updated Digital Personal Identity Score 206.

In addition, the user may request that the system uses their Legal Identity to seed the Digital Personal Identity reputation (208—Yes). This results in gathering information from a third party legal identity service and an updated Digital Personal Identity Score 210. For example, the third party legal identity service may be a network service 162 on one or more of machines 150_1 through 150_N.

By allowing the system to know and use the user's Legal Identity to determine an initial Reputation Score, then the system has the best knowledge of the user's past behavior, and the best chance to give an initial high score to this new Digital Personal Identity.

In another embodiment, the reputation system, perhaps without the new Digital Personal Identity owner's consent, may determine if the Digital Personal Identity's owner has previous nefarious behaviors (using their own Legal Identity or another of the user's Digital Personal Identities) that should impact the initial reputation of the Digital Personal Identity. It does this by consulting third party services, or by directly accessing sources (which may even include the Dark Web) to determine past behaviors. The outcome is that the new Digital Personal Identity may have a worse starting reputation than the default value, or in some cases, the Digital Personal Identity may be suspended.

Figure 3:
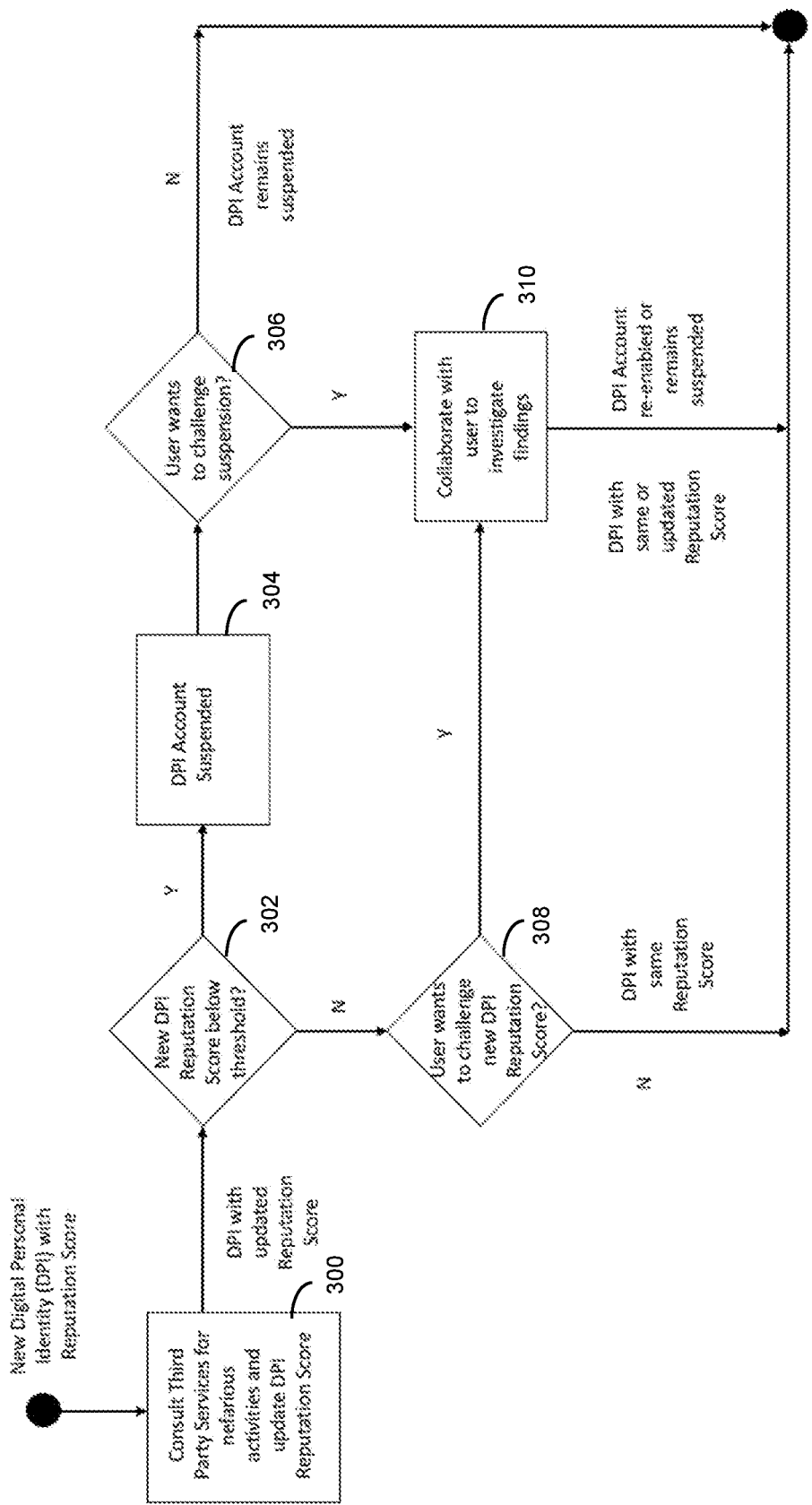
FIG. 3 illustrates operations associated with a digital personal identity with reduced initial reputation score.

FIG. 3 shows a flow diagram of how a new Digital Personal Identity may start off with a Reputation Score lower than the default value. The entry to the system is the new Digital Personal Identity with the default Reputation Score. By consulting with third parties or directly accessing information it may be determined there is data that indicates nefarious behavior by the owner of a Digital Personal Identity 300. In such cases, the Digital Personal Identity's reputation can be reduced immediately. In some cases, if the behavior is really unacceptable (302—Yes), the new Digital Personal Identity may be suspended from services 304 requiring a minimum reputation threshold. In such cases, the user should be given the option to challenge 306 the outcome to restore their own credibility or even perform positive actions to compensate for or offset the negative reputation. In the event of a challenge (306—yes) or (308—Yes) a service collaborates with the user to investigate findings 310.

Collecting reputation data for inclusion into the reputation system may take on many forms, such as proactive data mining, analytics gathering, personal submission, etc. Whatever the method used for collecting the data, the data is representative of actions that the Digital Personal Identity has taken. The process for collecting reputation data for a Digital Personal Identity is described in connection with the system 100 of FIG. 1. Consider the following steps:

1. An online user (e.g., Digital Personal Identity) is created. For example, a user with a client machine 102 accesses server 104 via network 106 to create the Digital Personal Identity through a set of prompts supplied by the reputation scoring module 142. Alternatively, the Digital Personal Identity creation prompts may be supplied by a process on a client machine 102, such as an API that communicates with a reputation server 104.

2. The Digital Personal Identity performs various actions (e.g., chats in a newsgroup, rents a home, purchases items, etc.). The actions are typically in connection with machines 150_1 through 150_N that support various network services.

3. Based on the digital identities' actions, they may receive ratings or reviews for their performance from other server users or even by the network services 150_1 to 150_N.

4. [Optional] the ratings data may be independently written to the Reputation Ledger 144, where they are independently and individually verifiable.

5. The reputation scoring module 142 receives, validates, and formats the ratings data received from the reputation producers.

6. The reputation scoring module calculates a Reputation Score for the current action and links it to the Digital Personal Identity via the Reputation Ledger 144.

7. Once the Reputation Score is calculated and prepared, it is written to the Reputation Ledger 144.

When a user (via their Digital Personal Identity) wants to access some online service, it may be prudent for the service to check the reputation of the Digital Personal Identity to ascertain whether the Digital Personal Identity can access the service, and to what level. As previously illustrated, the context may be very important. For example, if the service is an online forum, the Digital Personal Identity's reputation for social postings may dictate whether the Digital Personal Identity can have full access to the forum, or partial (perhaps moderated) access. A similar process may be used for financial transactions. This type of service may provide a low reputation Digital Personal Identity with a very limited service (or low dollar value), whereas a Digital Personal Identity with a proven track record of financial transactions would have greater flexibility. The process for requesting reputation data for a Digital Personal Identity is outlined by the following steps:

1) A Digital Personal Identity is created or used by a user or a client device 102.

2) The Digital Personal Identity accesses a third-party network service, such as an online commerce site hosted at machine 150_1.

3) The Online Commerce Site requests the Reputation Score for the Digital Personal Identity (perhaps limited to this context) from the reputation scoring module 142. That is, machine 150_1 communicates with server 104 via network 106.

4) In one embodiment, a Reputation Storage Interface (e.g., service API) is used to get the latest Reputation Score for the Digital Personal Identity.

5) The Reputation Storage Interface may also consult the reputation ledger 144 for more detailed information comprising the Reputation Score.

6) [Optional] In addition to querying for the Reputation Score, the Reputation Lookup Service may also log their query by submitting it to a Reputation Feedback Service. The purpose of this logging is to track Reputation Score accesses. The Reputation Feedback Service may similarly submit that reputation data to the Reputation Ledger.

For a reputation system to be reliable, transactions stored within it must be immutable, easily accessible for inquiry, and transparent. In one embodiment, reputation systems may be built in distributed data centers managed by organizations committed to the integrity and survivability of the reputation system. For example, reputation scoring module 142 and reputation ledger 144 may be distributed across a number of individual servers 104.

In another embodiment and in order to maintain the integrity and fault tolerance of the reputation system data, it will be linked to and/or stored within a distributed, public, and cryptographic ledger known as a blockchain.

The following are the major roles necessary to operate a blockchain-based reputation system:

Service Owner/Operator: creates the systems and rules by which the blockchain will operate. In one embodiment, the blockchain service owner will operate the blockchain according to stated principles and methods. In another embodiment, the blockchain owner will create a fully-decentralized blockchain system and launch it, so that it will be operated by the various participants regardless of whether the service owner continues to participate. The main financial benefit of the service owner comes through the creation of cryptocurrency coins, the appreciated value of the cryptocurrency, or collateral services made possible by the existence of the blockchain.

Miner: a miner (also known as a 'validator' node) has a key role in validating the data blocks written to the blockchain and participating in creating a consensus amongst the various blockchain miners. The main financial benefit of each miner comes when they successfully validate a block and complete a proof process specified by the respective blockchain, which results in the miner receiving a cryptocurrency coin. Since cryptocurrency coins (or tokens) may represent either convertible currency or tokens exchangeable for a specific good or service, the motivation and earning potential of each miner is determined by the particular blockchain.

Reputation Requestors (e.g., companies soliciting a reputation): in a reputation-based blockchain, the reputation requestors are usually querying the blockchain for the Reputation Score or report on one or more Digital Personal Identities. Requesting a Reputation Score or report will usually be submitted with a payment token or other currency. Typically, the payment for the report service will be made in the reputation blockchain's cryptocurrency, although other payment forms may also be accepted.

Reputation Producers (e.g., companies providing reputation data): producers of reputation data will provide data to be written into the reputation blockchain for later use. Given the sensitivity of some personally-identifiable data elements, these elements may be scrubbed, anonymized, or even cryptographically hashed prior to being written to the blockchain. Similarly to the miners, reputation producers will be compensated for their submissions, which would usually be made in the reputation blockchain's cryptocurrency.

Digital Personal Identity (about whom a reputation is created): the Digital Personal Identity is the focus of the reputation system and constitutes the subject about which the reputation data is collected, scored, and reported. The main benefit to each Digital Personal Identity is that it will receive a Reputation Score that is based on a set of blockchain-based reputation data items. This Reputation Score is provided to the reputation requestors, which may include a wide range of entities, such as: financial loan providers, social media discussion groups, prospective future employers, etc. Each Digital Personal Identity will benefit from their reputation being provided on their behalf as a way of conveying the justification for trust by the reputation requestors.

The foregoing blockchain components are implemented in system 100. For example, the reputation scoring module 142 may operate as a service owner/operator and miner. The reputation ledger 144 may support block chain operations. The reputation requestors may be one or more of the network services supported by machines 150_1 through 150_N. Block chain operations may be supported by machines 150_1 through 150_N.

Creating quantifiable reputations for digital identities begins with accurately and algorithmically analyzing reputation data. Before such analysis can begin, the nature of where and how to obtain reputation data should be defined.

In this context, reputation data is defined as any public action that a Digital Personal Identity performs (online or offline), any identifiable details that a Digital Personal Identity discloses, as well as, any other actions that are disclosed about the Digital Personal Identity (possibly within a set of to-be-determined constraints). The following are some examples of some methods of discovering reputation data:

Personal Branding: this includes the information that Digital Personal Identities disclose about themselves and can include things like: personal profiles, online resumes, curriculum vitae, a personal website, etc.

Social Media: this includes posting of information (e.g., video, audio, text, images, etc.), signaling that the Digital Personal Identity likes an online posting, chat history, comments, sharing of posted information, etc.

eCommerce Activities: making online purchases or sales, commenting on items solicited or for sale, produces/service reviews, etc.

Discussion Groups: communications or other designations made in online communication forums about topics of mutual interest.

Group Memberships: memberships in groups, websites,

Online Rentals: this includes activities such as property rentals, ride sharing, etc. Such services often have a mutual reviewing process that provides open reviewing material, which would contribute to a Digital Personal Identities' reputation.

Service Contracts: contract for hire services.

Online-Offline Activities: includes activities that are started online and complete offline or start offline and complete online, such as classified advertisements for physical world goods or services.

Mining Web Activity: many services collect information during a Digital Personal Identity's activity online.

Information collected may also contribute to Digital Personal Identity's reputation data.

Submitted Analytics: numerous types of analytics are gathered by various online venues (including those listed above) as part of normal operations of those sites. This collected information may be submitted by those sites in conjunction with their normal operations and contributed as reputation data.

Offline Activity Correlation: in some circumstances Digital Personal Identity information is collected by offline activity processes for various motivations such as future online advertising or marketing. Insomuch as this data can be collected from or solicited by offline process owners, it can be added to a Digital Personal Identity's reputation data.

The above points are meant to illustrate examples of several methods by which a Digital Personal Identity can be used that result in reputation data about a Digital Personal Identity. Any of these methods can be detected, measured, analyzed, reviewed, quantified, etc. for the purpose of contributing reputation data to a Digital Personal Identity's Reputation Score or report.

Figure 6A:
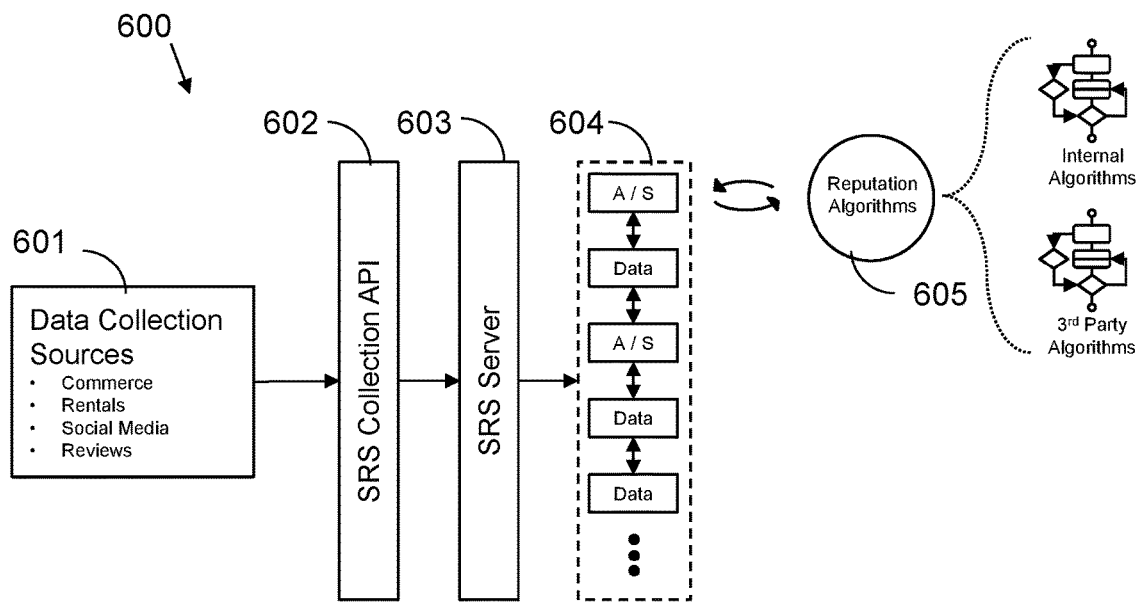
FIG. 6A illustrates operations associated with data collection sources submitting reputation attribute data via the Sudo® Reputation System (SRS_Collection API, their storage on a reputation blockchain, along with the algorithmic processing of reputation attributes and the storage of the reputation calculation result.

In one embodiment (see FIG. 6A), Data Collection Sources 601 comprise the set of any entity that submits reputation data to the reputation system. Such entities include, but are not limited to: organizations conducting commerce, rental companies, social media sites, product or service review sites, individual people, offline social clubs, etc. These and other entities submit reputation data using the SRS Collection API 602, which contains a set of methods callable over the network that relay information to the SRS Server 603. The SRS Server controls the storage mechanisms, which can include a single reputation blockchain 604 where reputation data and analyzed reputation scores are stored. Reputation Algorithms 605 periodically read reputation data from the blockchain, process it according to the particular algorithm, and store results on the blockchain. Reputation Algorithms may consist of internal algorithms provided by the reputation system or algorithms submitted by $3^{rd}$ parties for analysis.

Figure 6B:
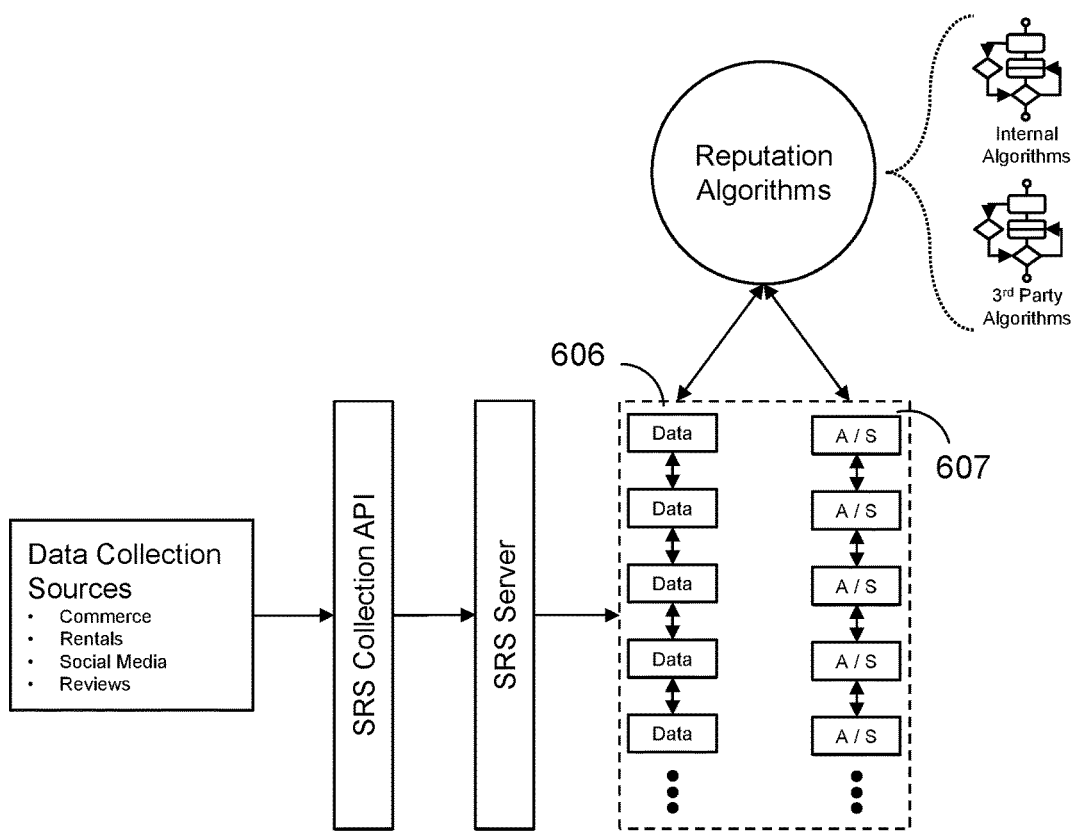
FIG. 6B illustrates the architecture presented in FIG. 6A with the storage elements comprising one blockchain for reputation attribute data and another blockchain comprising the specified reputation algorithm and the calculated reputation scoring results.

In another embodiment (see FIG. 6B), the blockchain storage mechanism may consist of more than one blockchain. In this embodiment, one blockchain mechanism controls the storage of reputation data 606 while a separate reputation score blockchain 607 contains the analyzed reputation result scores.

Figure 6C:
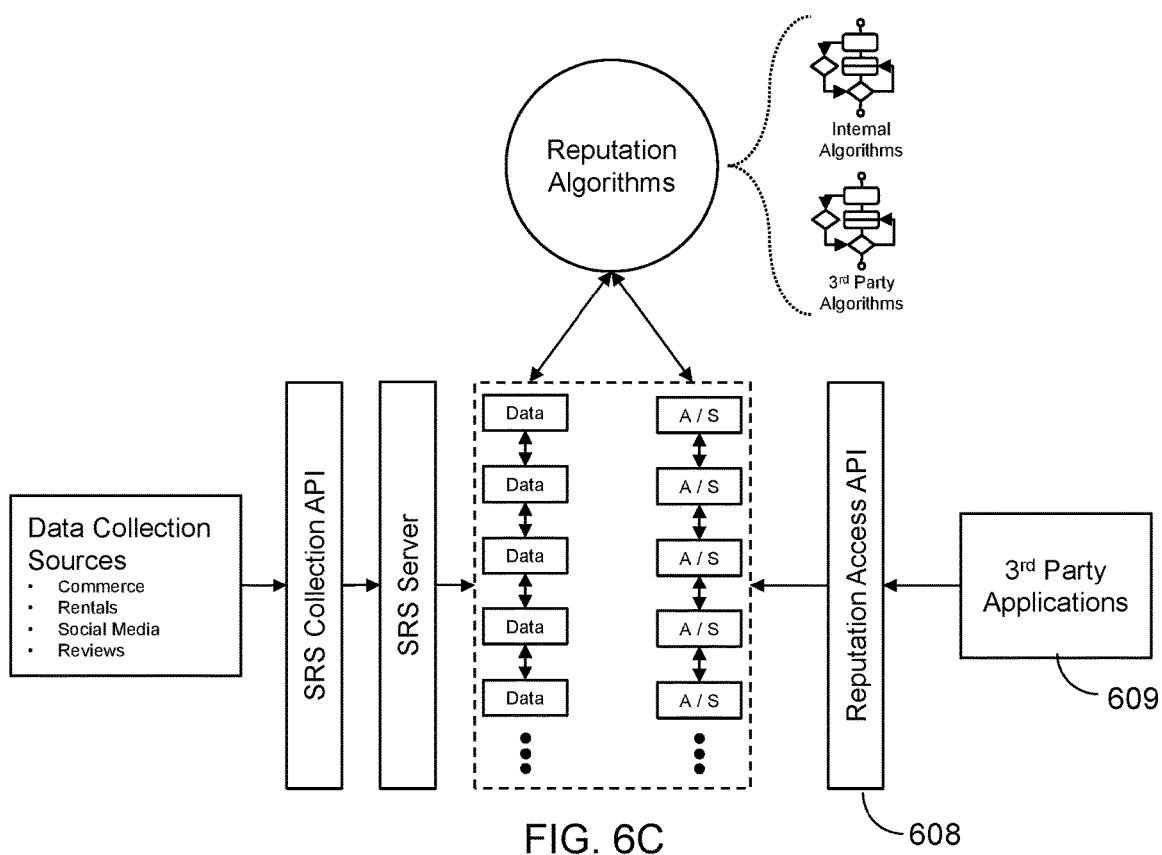
FIG. 6C illustrates the architecture presented in FIG. 6B and introduces the Reputation Access API that enables 3rd Party Applications to connect to the reputation system to lookup reputation scores and/or details.

FIG. 6C presents a Reputation Access API 608, which enables $3^{rd}$ party applications 609 to connect to the SRS systems and query the storage mechanisms to lookup a reputation for a particular Digital Identity. The Reputation Access API may also allow a $3^{rd}$ party system to query the reputation data and receive results.

Figure 6D:
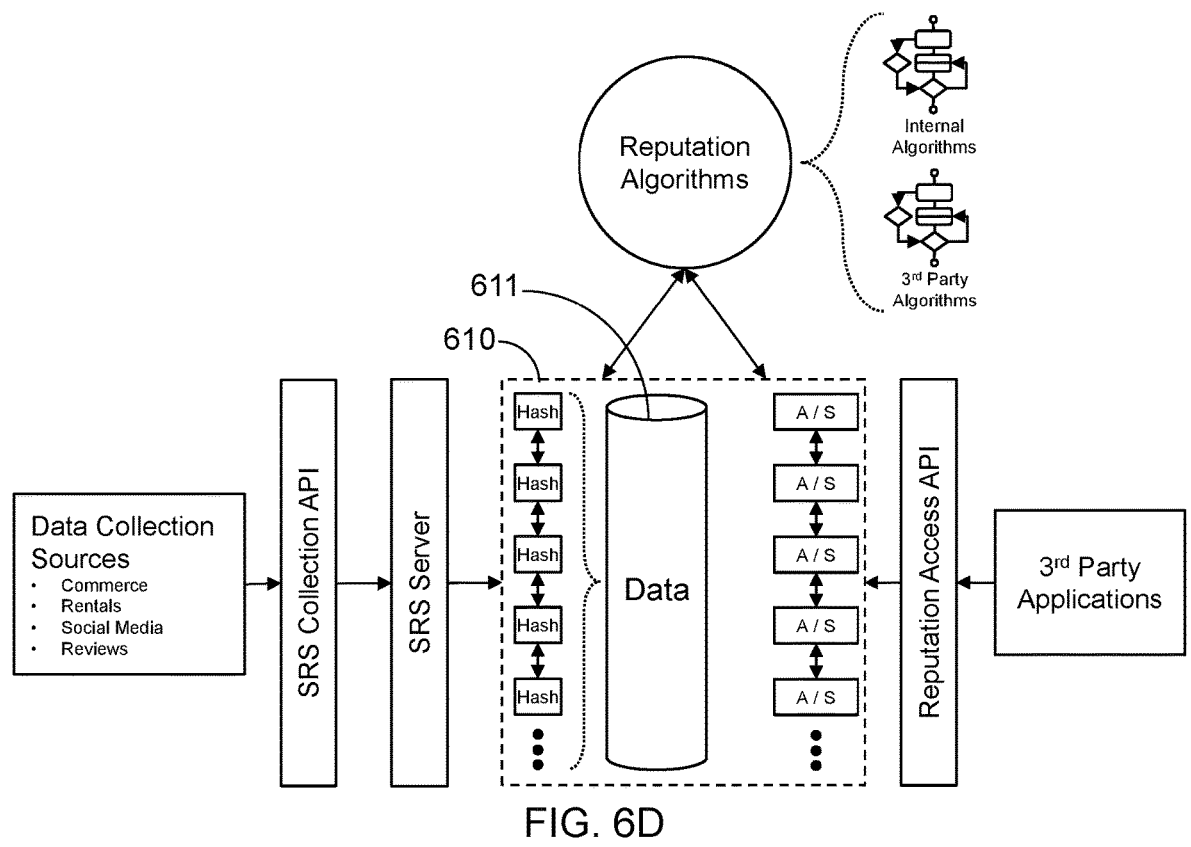
FIG. 6D illustrates the architecture presented in FIG. 6C with the reputation attribute data blockchain storing the actual data off-chain in a related database.

In another embodiment (see FIG. 6D), the storage mechanism containing the reputation data may include a blockchain that contains a hashed value of the reputation data 610 with the reputation data itself being stored on an alternative data storage system 611, such as a networked database. This embodiment benefits the reputation data blockchain by keeping it small and fast to be used as an index and verification mechanism for the actual reputation data stored on a more traditional data store (e.g., database).

Figures 6E, 7:
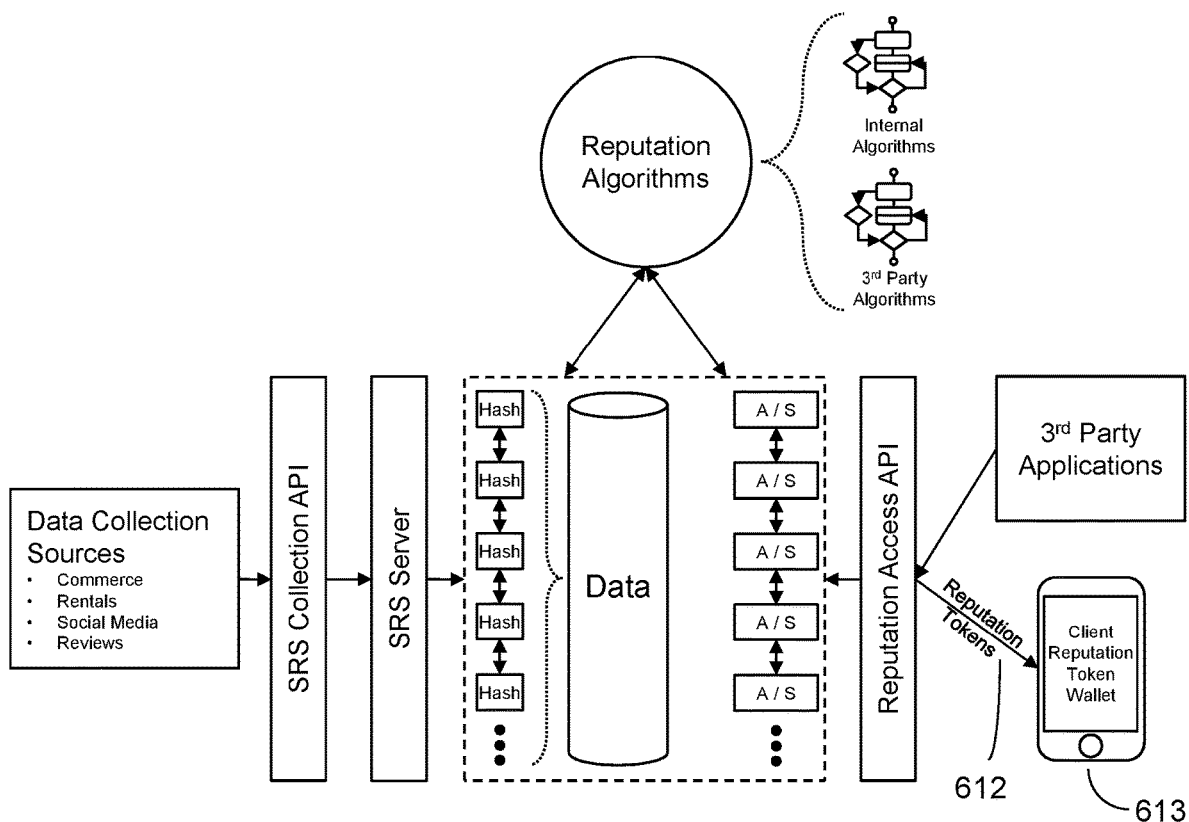
FIG. 6E illustrates the architecture presented in FIG. 6D and introduces the method of 'reputation tokens' being sent to and stored by a client device. This enables clients to transfer reputation tokens to consuming parties out of band (or when offline) from the main reputation system.
FIG. 7 illustrates the storage element structures used by the algorithm processing result data as outlined in FIGS. 6A-6E.

In FIG. 6E, Reputation Tokens 612 are verifiable and provable data structures that represent a reputation, reputation data element, and/or reputation data set. These tokens are issued to a corresponding (or owning) Client Reputation Token Wallet 613. Owners of the Client Reputation Token Wallet may convey the token to another party for the purposes of validating a transaction (e.g., commerce, provable facts, etc.). Receivers of the Reputation Token can validate them with the reputation system using the Reputation Access API.

FIG. 7 provides an overview of the main data elements that are stored on the reputation score blockchain 607. As shown in FIG. 7, each reputation blockchain entry (denoted as a table row) contains: Digital Identity ID, Reputation Algorithm, Reputation Score, and Reputation Data. The Digital Identity ID specifies the identity for which the reputation has been calculated. The Reputation Algorithm specifies which algorithm has been used to process the reputation data. The Reputation Score contains the results of the algorithm processing the Reputation Data. Since a given algorithm may examine numerous Reputation Data elements, the list of reputation data elements used in the computation of the Reputation Score are enumerated.

In calculating a Digital Personal Identity's reputation, the reputation data is analyzed by a variety of reputation calculation algorithms. In some embodiments, in addition to the reputation data being analyzed, the reputation the person or entity submitting a piece of reputation data is taken into account when computing a reputation score. By including the reputation of the submitter in the reputation algorithm, such algorithms will naturally de-prioritize or 'weed out' reputation data submitters that operate contrary to the goals of the reputation system. One example of the contrary behavior is that they may simply rate everyone abnormally low or submit reviews meant to otherwise cause trouble. As malicious or abnormally-biased reviewers continually submit low (or high) reviews, reverse reviews will also decrease their own reputation scores. If an identity becomes known for continually submitting hostile reviews, then this process will mitigate their reputation data submissions and give them a lower impact on the resulting reputation score being calculated for the target identity.

In one embodiment, a new Digital Personal Identity will have a new Reputation Score created and written to the blockchain associated with the reputation ledger 144. This will ensure that the Digital Personal Identity can convey their respective level of trust to any reputation requestor that will ask.

Transactions and/or data written to a blockchain are packaged into blocks. A block is the basic unit of a blockchain and normally contains the transaction data between one or more parties wishing to publically store a transaction or information set in a decentralized and immutable manner. Additionally, blocks may also contain information such as: an identifying number, a size, header information (corresponding to a particular blockchain), a transaction counter, and a list of other transactions or data to be added to a block and simultaneously processed. Individual transaction data are frequently packaged together in order to expedite processing throughput. The exact format and structural/managerial content of a block is determined by the blockchain system to which it is written.

For large data sets, a reference to the data set may be added to a block, rather than the entire data set itself. The space within a block is usually quite a bit more costly than traditional storage space, which is due to the storage, handling, and management costs involved in processing blocks within a blockchain.

In this disclosure, it is presented that a Digital Personal Identity is written to a blockchain. A Digital Personal Identity may contain a wide range of information such as a Digital Personal Identity's identifying information, references to performance data, the Digital Personal Identity's calculated reputation, etc. A full description of a Digital Personal Identity's contents and structure, is defined in U.S. Ser. No. 15/714,933, entitled Apparatus and Method For Building, Extending and Managing Interactions Between Digital Identities and Digital Identity Applications, which is incorporated by reference into this disclosure.

The general process of writing a new Digital Personal Identity, and its default reputation score, to a blockchain is as follows:

1. A new Digital Personal Identity is created. This identity may be created:
   a. by an individual user independent of a related identity management system
   b. by enrolling in a separate identity management system (e.g., separate blockchain)
   c. by linking a previously-created identity from an external identity management source
   d. by enrolling in this reputation system and creating a new identity as a by-product.
2. The new Digital Personal Identity is submitted to the reputation scoring module 142.
3. The reputation scoring module 142 creates the initial Reputation Score. This score can be set to a default value or it may also be based on the Reputation Scores of the owner's other Digital Personal Identities or Legal Identity, as has been described above.
4. While the reputation scoring module 142 is generating the initial Reputation Score, other reputation data may be collected and submitted to that process.
5. Once the initial Reputation Score has been created, it is passed to the Blockchain Holding Queue (a blockchain management process) as a block that is pending inclusion into the blockchain, as controlled by the reputation ledger 144.
6. Once the system is ready, the block is made available to the miners who will validate the block, perform various proof calculations, and achieve consensus regarding the block.
7. Once the block has been successfully processed, it is written to the blockchain.

Figure 4:
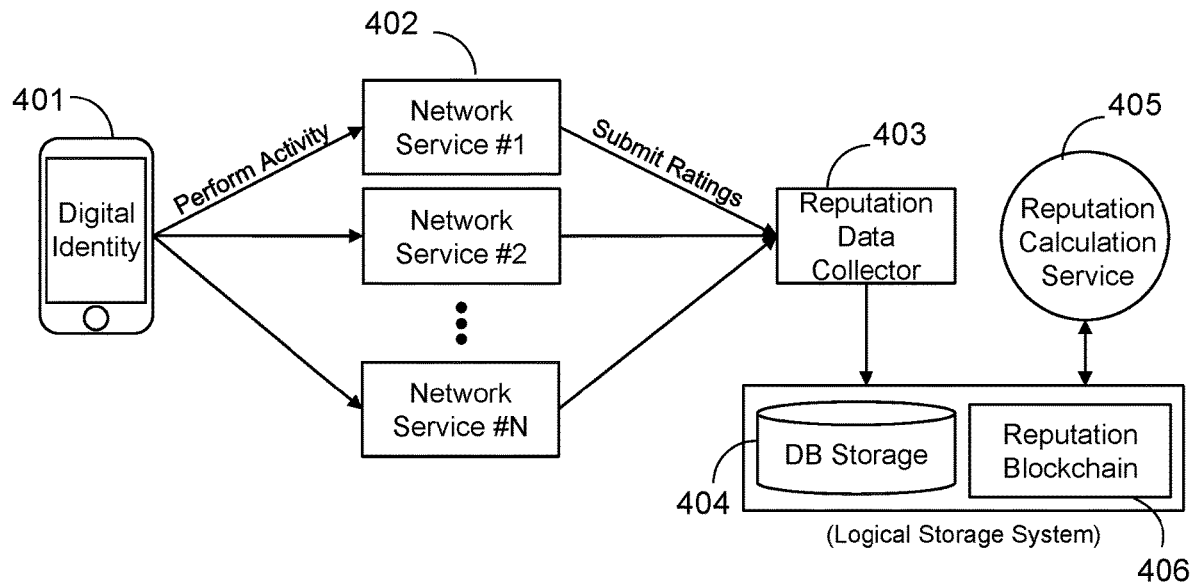
FIG. 4 illustrates operations associated with collecting reputation attribute data from submitting sources, storing it in databases and blockchain(s), as well as, calculating reputations.

As shown in FIG. 4, a Digital Personal Identity will undertake activities that will result in an updated Reputation Score that is written to the blockchain. This will ensure that the Digital Personal Identity can convey their respective level of trust to any reputation requestor that will ask. This process is outlined by the following steps:

1. A Digital Personal Identity 401 will access a third-party network service 402.
2. Both the online service and the Digital Personal Identity may report their experience to the reputation data collector module 403.
3. The reputation data collector module 403 augments the reputation data stored in the database storage 404.
4. The reputation calculation service 405 periodically calculates (or re-calculates) the reputation score by algorithmically processing the reputation data stored in the database storage 404.
5. Once the updated Reputation Score has been calculated, it is passed to the Blockchain Holding Queue (a blockchain management process) as a block that is pending inclusion into the blockchain of the reputation blockchain 406. The actual reputation score may be written directly to the Blockchain Holding Queue or it may be added by reference (e.g., as a hashed value) for increased privacy.
6. Once the system is ready, the block is made available to the miners who will validate the block, perform various proof calculations, and achieve consensus regarding the block.
7. Once the block has been successfully processed, it is written to the blockchain.

Figure 5:
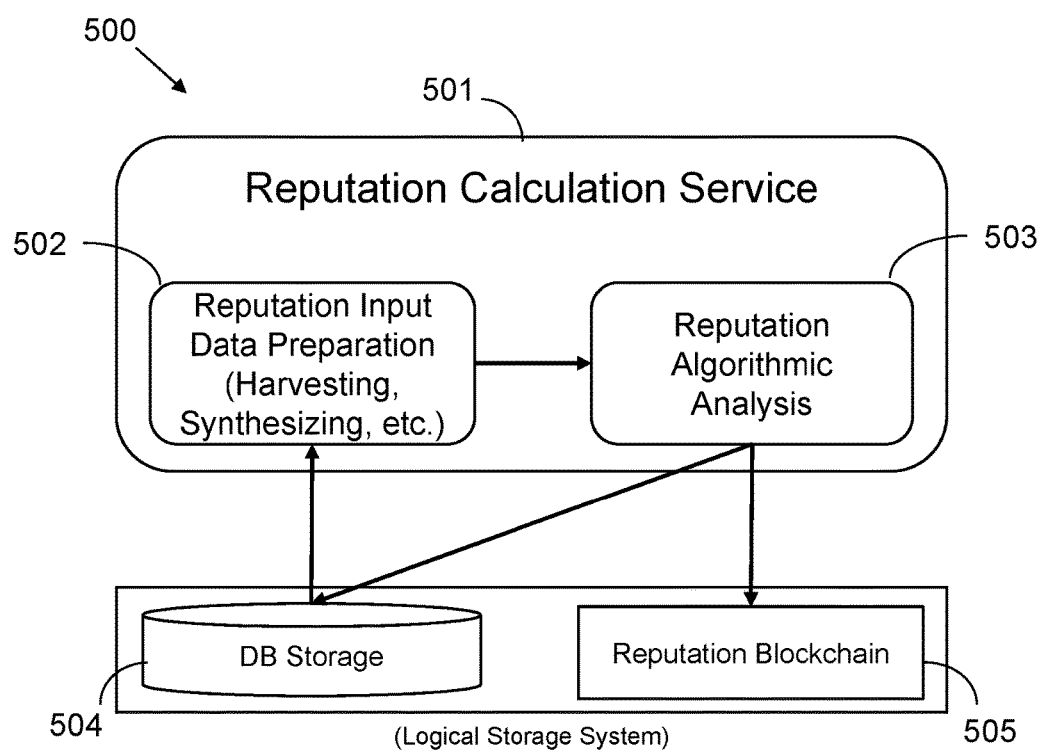
FIG. 5 illustrates operations associated with storing and retrieving reputation attribute data, calculating reputation scoring results, and storing resulting algorithmically-determined reputation data elements.

Further describing the processes depicted in FIG. 4 and FIG. 5, the main data processing steps include: data collection, data cleansing, data organization, and data processing. Data collection may take place through automated collections, such as screen scraping, voluntary submission, public database access, commercial database access, etc., all of which are intended to collect a wide range of activity-based information performed by a Digital Personal Identity. After being collected, the reputation data is cleansed, organized, and processed using a series of natural language techniques including (but not limited to): sentence and word tokenization, grammatical and syntactical parsing, and finally using knowledge graphs, word embedding, and bi-directional recurrent neural networks to fill in information which might be missing from the data.

Digital identities go through a rigorous and methodical process which determines levels of trust and defines characteristics of the Digital Personal Identity whose true Legal Identity may not be known. To understand how reputation and trust relate to Digital Personal Identities, first requires a series of unsupervised techniques to collect data describing online activities, and then process that data in order to understand the patterns and consequences of all types of online activities.

Figure 8A:
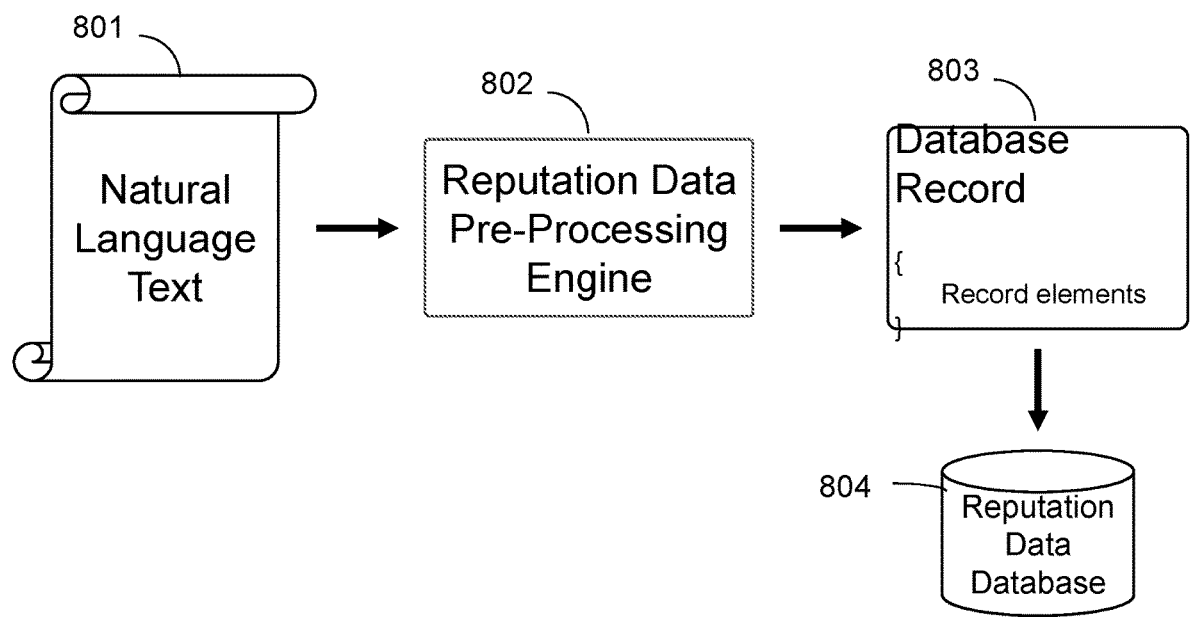
FIG. 8A illustrates operations associated with the reputation processing algorithms receiving natural language text, pre-processing the input text, structuring the input text into database records, and storing the database records into the reputation database.

Prior to the execution of the Reputation Calculation Service 405 from FIG. 4, a pre-processing step is applied to any natural language text that is collected by the Reputation Data Collector 403. During this pre-processing step, as shown in FIG. 8A, the natural language text 801 is sent to a Reputation Data Pre-Processing Engine 802 for adaptation to a machine-readable format. Upon completion of the Reputation Data Pre-Processing step, the data is converted to Database Records 803 and stored in the Reputation Data Database 804. For one embodiment, the Database Records 803 is further detailed, as an example, in FIG. 8B.

A data transformation process inside a reputation engine may include text processing. For example, a blob of text data enters the reputation engine of the reputation scoring module 142. The Reputation Pre-Processing Engine performs the following natural language pre-processing processes:

1. Translate text to English (if necessary)
2. Tokenize (separate) text by sentence and then by word.
3. Apply part-of-speech tags.
4. Parse into syntactical trees to disambiguate meaning of words individually, as well as the meaning of the entire sentence.
5. Search for certain grammatical structures (grammars) which represent actions taken on objects.
6. Extract all named entities (people, geographic locations, dates, etc.).
7. Build Knowledge Graphs or Neural Association Models to show conditional probabilities between two entities.
8. Transform each sentence into a word embedding to predict context of surrounding words.
9. The transformed data is stored into nodes of a graph database in a formatting structure, such as JSON.

In one embodiment, the Reputation Calculation Service 405 from FIG. 4 is further broken down into sub-processes as shown in FIG. 5. This process is outlined in the following steps:

1. The Reputation Calculation Service 501 operates a Reputation Input Data Preparation sub-process 502 that performs data harvesting functions on the input data, such as: parsing, cleaning, processing, organizing, modeling, etc.
2. Once the input data has been harvested, the Reputation Input Data Preparation module 502 performs Synthetization processes, such as: scraping, aggregating, monitoring, parsing, cleaning, organizing, modeling, etc.
3. Once the input data has been harvested and synthesized, the Reputation Algorithmic Analysis 503 process refines the prepared input data according a wide range of reputation calculation algorithms that it contains. Such algorithms may be added by the designers of the Reputation Calculation Service 501 or they may be subsequently added by $3^{rd}$ party reputation algorithm designers.
4. As reputation scores are created according to the reputation calculation algorithms, the results (either directly or by reference) are written to the Reputation Blockchain.

All of these supervised and unsupervised model activities take place in what is called Reputation Learning. The ultimate goal of reputation learning is to identify and isolate different segments of the population based on civilized and normal activity versus fraudulent, defamatory, and/or criminal behavior. A solid understanding across all reputation types in the Reputation Learning phase is analyzed, organized, and stored in a large graph database. While other database structures may be used to implement this step, a preferred embodiment is to use a graph database.

Figure 8B:
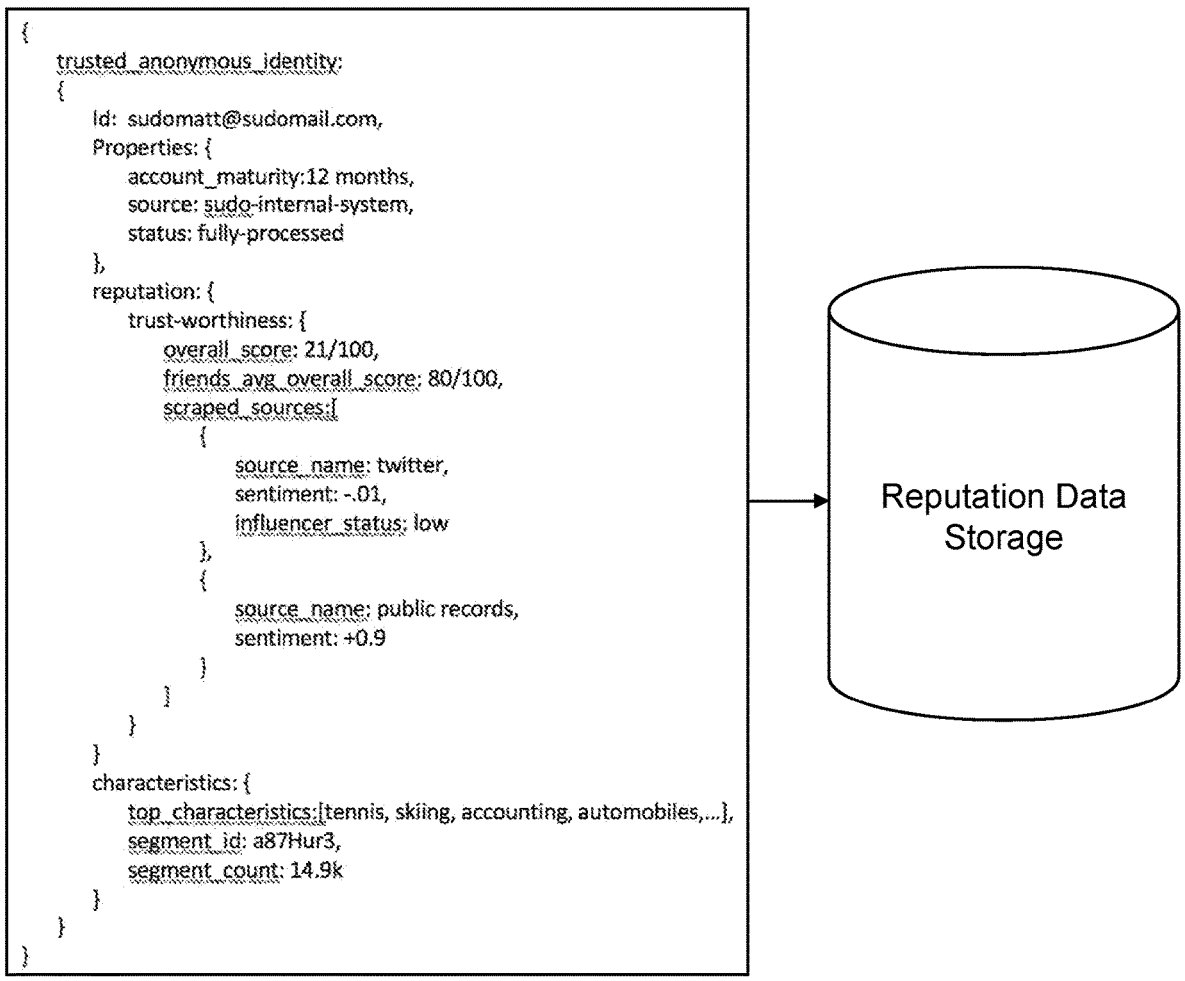
FIG. 8B further depicts an example format of the reputation data storage record format.

Nodes in the graph database represent keywords, named entities, websites, companies, persons, and other known entities, which are assigned very specific reputation measurements. Included in each node is an embedded structured object, such as a JSON object, an example of which is depicted in FIG. 8B. Such an object includes basic descriptive information about the known entity, as well as information learned through machine learning and deep learning relating to sentiment, reliability, and usability ratings. The nodes in the graph database are connected via edges which display relationships between adjacent objects in a contextual setting.

Figure 9:
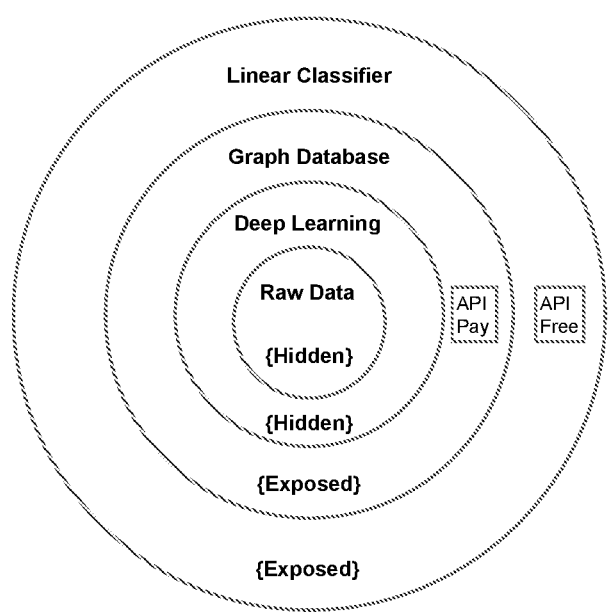
FIG. 9 illustrates the levels of reputation data processing algorithms that are part of the reputation system, plus which algorithmic results may be accessed by either free or premium services.

One embodiment of the invention utilizes a hierarchy of models from raw data to a first layer with Part of Speech (POS) tagging, syntactic analysis, named entity extraction and word embedding. A subsequent layer has sequential modeling (e.g., neural networks). A subsequent layer summarizes text, predicts future text, performs sentiment analysis and discovers topics. A final layer is a linear classifier to summarize a reputation. These layers are depicted as a hierarchy in FIG. 9.

Knowledge graph models describe the conditional probabilities between any two nodes in the graph. In this case, the knowledge graph would assign conditional probabilities to any two behaviors in the graph database. Understanding these conditional probabilities in a global setting allows the system to suggest how a Digital Personal Identity might improve and/or modify its Reputation Score to achieve a desired outcome. An example of this would include a Digital Personal Identity who desires acceptance or greater status when posting on a large forum. The system could show them what actions would need to take place in order for their Reputation Score to achieve the minimum threshold value required to post to that forum. The knowledge graph would also assist in identifying patterns of fraudulent, undesirable, or even criminal behavior as it first appears to move towards fraudulent or criminal behavior. In some instances, trend analysis in a graph model/database could even help predict the likelihood of criminal behavior before it actually happens.

When a Digital Personal Identity enters the reputation system, a series of analytical processes attempt to refine, clean, parse, and enrich the original data in order to more holistically understand the identifier. Once the Digital Personal Identity has been thoroughly checked and researched, all contextual information goes through a series of cleansing, parsing, and organizing steps similar to the processes discussed previously in the Reputation Learning phase. Missing information is addressed with word embedding and bidirectional recurrent neural networks. The cleaned data is then parsed and entities are stored in the graph database with edges being constructed between other nodes already in the graph.

Once all information is in the graph database, a series of queries and models are established which show common connects with the reputation environment. Connections with known entities who have pre-assigned Reputation Scores associated with them also play a role in defining the reputation of the Digital Personal Identity. The lightweight linear classifier is then used to classify a Digital Personal Identity with either the larger portion of the population who have a reputation which displays no concern versus the much smaller part of the population which shows significant signs of fraudulent, criminal, or defamatory behavioral patterns. The principal goal of the lightweight classifier is to understand and interpret the coefficients which make up the model to explicitly define how the model is functioning. This phase is known as Identity Research.

Throughout the data processing and modeling phases, great care is taken to avoid the inherent bias embedded through human interaction. Instead of a human defining what is a "good" reputation versus a "bad" reputation, we leverage our unsupervised learning methods to learn different types of reputation, the outward actions or behaviors of which are interrogated and interpreted by other parties wishing to transact or engage with the Digital Personal Identity. The combined information learned in the Reputation Learning phase and the Identity Research phase is stored in an evolving graph database which is stored and accessed via public and private blockchains.

When new Digital Personal Identities are created, they are initialized with a default Reputation Score, which is determined by the host reputation system. As the owner uses the Digital Personal Identity to perform actions, its reputation will increase or decrease according to the actions performed. Building reputations is accomplished through a series of acts and takes place over an arbitrary length of time.

Occasionally, the owner of an existing Digital Personal Identity may want to create additional Digital Personal Identities for use in other activity scenarios separate from that in which the original Digital Personal Identity operates. In these cases, the Digital Personal Identity owner may opt to create one or more Digitial Personal Identities that are each set to the default Reputation Score. In other scenarios, the Digital Personal Identity owner may choose to create a new Digital Personal Identity, but may desire a Reputation Score that is elevated above the default value.

Creating a new Digital Personal Identity (B) with a Reputation Score above the default can be accomplished when the new Digital Personal Identity (B) is created by the owner of an existing Digital Personal Identity (A). In this instance, the new Digital Personal Identity (B) may be initialized with the current Reputation Score of the existing Digital Personal Identity (A). This process ensures that the new Digital Personal Identity (B) is initialized with a Reputation Score that has previously been earned by the owner of the existing Digital Personal Identity (A).

In other embodiments, a new Digital Personal Identity (B) may be initialized with the combined Reputation Scores of more than one Digital Personal Identity. Calculating a combined Reputation Score may be as simple as summing each of the Reputation Scores from the root Digital Identities and then calculating the average score. In this embodiment, the average score can be assigned as the initial Reputation Score for the new Digital Personal Identity.

In other embodiments, the new Reputation Score may be calculated based on a more complex combining function deemed fair by the host reputation system or by the majority of the reputation system's other participants. There is no limit to the type of Reputation Score initialization functions that can be created and used within a given reputation system.

Contextual reputation requests are requests for a Digital Personal Identity's reputation within a requestor-defined context. Digital Personal Identity reputations can be quite large in scope and may contain reputation data from a large number of varying activity types, such as: financial transactions, social media communications, professional activities, hobbies, etc. Contextual reputation requests allow a requestor to solicit a Digital Personal Identity's reputation within a very specific scope. For example, a financial service may request a Digital Personal Identity's financial reputation without concern for their social media participation reputation, if such is not considered relevant to financial services. Contextual reputations allow a Digital Personal Identity to be evaluated on particular areas rather than on the entirety of their activities.

Contextual reputation requests are passed through a cleansing process which dissects the request input down to its most granular level and mathematically represents the reputation data as a vector of limited-length continuous data. These reputation data vectors are then compared to syntactically similar data already stored in the system. This rigorous process helps to overcome the ambiguity problems with human language in which two people may use very different words to describe the same idea. A contextual request from one party may be very similar to the contextual data stored inside the reputation system but use very different language to describe the desired analysis. In this case, the system performs the actual analysis on ideas or concepts more specifically than on the exact words used by the reputation requestor.

The output of the reputation engine consists of a probabilistic risk profile independently constructed for each Digital Personal Identity for which reputation data is collected. These risk profiles contain fully processed reputation data that has been organized according to a wide range of processing techniques and stored in a database for later update and retrieval. When subsequent lookup queries are performed for Digital Personal Identities whose reputation data has been collected and processed, that processed information is accessed and then retrieved, correlated, and formatted according to the type of query request that has been made.

Reputation scoring information may be represented as risk score probabilities that are defined as a continuous measurement from low trust to high trust. In order to simplify the interpretation of risk and impose a discrete or objective decision boundaries on the outputs from our computational method (e.g., "good trust" vs. "bad trust"), the output probabilities are mapped onto a simpler geometric plane to facilitate and maximize human understanding.

Non-inclusive examples of simple reputation/risk representation display methods are as follows:
  Stoplight motif: divides the probabilities into three separate categories, namely red, yellow, and green. These color values provide viewers with a readily recognizable representation of risks with green representing good, yellow representing caution, and red representing higher risk.
  Thumbs Up/Down: a simple binary representation of good or bad.
  Star Rating: normally on a scale of 1-5, the more stars displayed represents a value of goodness as opposed the negativity represented by fewer stars.
  Thermometer: quite often displayed as a graphical sliding scale ranging from empty to full or low to high.
  1-10 Scale: a numeric range with 1 representing high risk (bad) and 10 representing low risk (good). Depending on the type of information being represented, this scale may be reversed.

The above examples are meant to illustrate a limitless set of methods whereby a complex set of reputation data and calculated values can be represented sufficiently simple so as to be easily recognizable by human viewers.

Given the inherent nature of modeling risk in cases like fraud and abuse, the goal is to minimize the false-negative instance in which case the model fails to identify a mal-intentioned Digital Personal Identity.

By design, data in the reputation system is open and accessible by many different parties which may choose to query or analyze the data for different purposes. As data is extracted from the web via web scraping, pulling data through APIs, or other online sources, special attention is paid to redact and cryptographically hash any personally identifiable information (PII) in order to protect all identities in the system.

Accessibility to the data in the reputation system is divided into multiple tiers based on the needs and requirements of the different parties involved. All details in the data which provide geo-location specific or person-level specific information is removed and replaced with a more abstract representation of the data point. An example of this would be replacing an IP address with city, State, and/or country information. As raw data is loaded from several different systems into the engine, it is redacted and transformed before it is stored in the system. This most granular view of the stored data is accessible only by the organization which set up the process. Sitting on top of this inner-most layer is a series of computational methods (Deep Learning layer) which analyze a more abstract view of the data points. In one case, one such computational method may address the sentiment of all pieces of textual data flowing into the system from a particular identity. Additionally, another computational method may seek to address the likelihood of criminal activity based on the identity's behavior online. Output from the Deep Learning layer is stored in the Graph Database layer. This layer is publically accessible via an API.

As already defined above, reputation is the summation of many behaviors over a long period of time. Reputation, therefore, is attached to a specific behavior of a Digital Personal Identity. There are many advantages to approaching the problem in this paradigm. It gives the computational method an understanding of how reputation may be affected by future actions. Since the system understands which components of reputation have the highest likelihood for improving the overall reputation, it can recommend what specific behaviors a Digital Personal Identity might complete to achieve a specific reputation level.

Attaching reputation to a specific behavior also has advantages in the system, as the reputation for a specific behavior might evolve over time. Initially, a specific behavior may appear to be appropriate and trustworthy and later demonstrate a strong negative effect. A Digital Personal Identity's reputation therefore is a calculation or function of all their past behaviors with more weight given to more recent behaviors or more positive/negative behaviors. If a specific behavior's reputation changes, it will automatically be updated throughout the entire system affecting all identities associated with it.

There are certain advantages inherent in using a graph database compared with a traditional database. Although most queries which are written against a graph database can also be run in a more traditional relational database, many efficiencies are gained when leveraging a graph database. The world is a deeply connected set of nodes which interact with each other. These interactions are generally expressed in a traditional database through joining tables or merging collections. Many lines of code are written in complicated queries for the sole purpose of connecting the data tables or collections. Graph databases are set up in such a way to link all connections between nodes as the data enters into the system. Instead of joining a number of tables and queries against the collection of joined tables, one "traverses" the graph database by simply referring to the relationships between nodes. The traversal of nodes in a graph may include multiple layers or hops in which the relationship between multiple nodes might be multiple steps away from a primary or initial connection. When dealing with crime, fraud, and abuse cases, graph databases are central to data storage and information extraction. Given the nature of visualizing abnormal behavior, simple queries against a graph database may simplify the understanding of complex relationships extensively. This latter benefit leads to reduced costs in development, maintenance, and administration to the database system.

More specific to the reputation service, a graph database will house complicated information stored on specific data points describing behaviors related to Digital Personal Identity. Updating information to the behavior of one node in the graph, propagates that information instantly throughout the system. An example of this benefit would be the change of reputation in a website visited by many Digital Personal Identities in the system. When the reputation of the known website suddenly changes due to information discovered by the system, this instantly changes the graph traversal queries run against the reputation of all anonymous identities associated with this website. Updating one property stored on a node instantly changes the overall reputation for the Digital Personal Identities. In an open reputation system with multiple parties simultaneously querying the system for real-time results, this benefit of instant information change is a necessity.

The task of classification resides near the edges of the network or more directly involves the behaviors of the Digital Personal Identity, rather than the Digital Personal Identity themselves. The actual analysis involves the following steps (for additional details, see FIG. 8A, FIG. 8B, and FIG. 9:

1.) Downloading large corpora of known behavior types.
2.) Process the textual data with the following process:
    a. Removing all stop-words
    b. Transforming each word to get the lemma
    c. Running a word embedding model which seeks to predict a window of words surrounding any given word. (This analysis displays semantic relationship information which provides a mapping of common words surrounding any given word in the corpora.)
    d. The model output is a mapping of words to a word vector. (Word vectors consist of a finite number of continuous variables, generally between 50 and 300 values, which mathematically represent the idea behind the word and its place in a given language.
3.) When a new behavior is presented in the database, say visiting a website, a series of processes seek to enrich that data source. If the data is textual in nature, a similar set of transformations are implemented to transform the data to a word vector.
4.) When the word vector for the behavior is known, a similarity calculation takes place between that vector and all of the word vectors in the word embedding model.
5.) A list of the most similar word embedding vectors is sorted in descending order and then transformed to its language counterpart (representation of a word).
6.) This list of comparisons then allows us to attach a known reputation score or scores with any behavior in the reputation system.
7.) When someone wants to run a similarity analysis against an anonymous identity, the system runs a linear model against all behaviors associated with that identity.
8.) The ultimate reputation of the anonymous identity is the summary provided by the linear classifier against all known behaviors associated with it.

Collectively, the reputation systems include the full range of functionality necessary to collect, calculate, and report the reputation for a given Digital Personal Identity. From time to time, it may be desirable to open access to the reputation systems by external applications or systems. For this reason, Application Program Interfaces (API's) may be created and published, in order to provide connection-based services to third parties. While the API's themselves, are not specified in this disclosure, it should be understood that such API's are created, updated, and refined on an ongoing basis.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   a processor; and
   a memory connected to the processor, the memory storing instructions executed by the processor to:
   compute computer network activity reputation attributes for a plurality of digital identities, wherein the plurality of digital identities have identity attributes different than identity attributes associated with a real individual utilizing the plurality of digital identities for computer network activity,
   coordinate the storage of the computer network activity reputation attributes for the plurality of digital identities in a block chain system distributed across a block chain network of computers,
   supply selected computer network activity reputation attributes for the plurality of digital identities in response to a request from a machine, wherein the selected computer network activity reputation attributes are communicated over a network of computers to the machine;
   create new digital identities with new computer network activity reputation attributes, wherein the new computer network activity reputation attributes are assigned when the new digital identities are created and are alternately selected from existing individual reputation attributes for one of the plurality of digital identities and existing computer network activity reputation attributes for the real individual.

2. The apparatus of claim 1 wherein the computer network activity reputation attributes are stored in a graph database.

3. The apparatus of claim 1 further comprising instructions executed by the processor to collect the computer network activity reputation attributes from network services connected to the network of computers.

4. The apparatus of claim 1 further comprising instructions executed by the processor to generate harvested data from the computer network activity reputation attributes, wherein the harvested data is generated from one or more of parsing, cleaning and modeling.

5. The apparatus of claim 4 further comprising instructions executed by the processor to form synthesized data from the harvested data, wherein the synthesized data is generated from one or more of scraping, aggregating, monitoring, parsing, cleaning and modeling.

6. The apparatus of claim 1 wherein the instructions to compute computer network activity reputation attributes are based upon a proprietary reputation system.

7. The apparatus of claim 1 wherein the instructions to compute computer network activity reputation attributes are based upon a third-party reputation system.

8. The apparatus of claim 1 wherein the computer network activity reputation attributes each include a digital identity identifier, a reputation algorithm identifier, a reputation score and reputation data.

\* \* \* \* \*